(12) United States Patent
Sfaradi et al.

(10) Patent No.: US 9,392,160 B2
(45) Date of Patent: Jul. 12, 2016

(54) CIRCUIT AND METHOD PROVIDING WIDE DYNAMIC-RANGE OPERATION OF AUTO-FOCUS(AF) FOCUS STATE SENSOR ELEMENTS, DIGITAL IMAGING DEVICE, AND COMPUTER SYSTEM INCLUDING SAME

(71) Applicant: SAMSUNG ELECTRONICS CO., LTD, Suwon-si, Gyeonggi-do (KR)

(72) Inventors: Roee Sfaradi, Nes Ziona (IL); Amit Eisenberg, Kiryat Ono (IL)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 76 days.

(21) Appl. No.: 14/310,369

(22) Filed: Jun. 20, 2014

(65) Prior Publication Data

US 2015/0373250 A1    Dec. 24, 2015

(51) Int. Cl.
*H04N 5/232*    (2006.01)
*H04N 5/235*    (2006.01)
*G03B 13/36*    (2006.01)

(52) U.S. Cl.
CPC ............ *H04N 5/23212* (2013.01); *G03B 13/36* (2013.01); *H04N 5/2355* (2013.01)

(58) Field of Classification Search
CPC   H04N 5/23212; H04N 5/2353; H04N 5/2355
See application file for complete search history.

(56) References Cited

U.S. PATENT DOCUMENTS

| | | | |
|---|---|---|---|
| 6,906,751 B1 | 6/2005 | Norita et al. | |
| 7,496,291 B2 | 2/2009 | Bloom et al. | |
| 7,671,918 B2 | 3/2010 | Onozawa | |
| 8,218,962 B2 | 7/2012 | Fujii et al. | |
| 2008/0074534 A1* | 3/2008 | Kusaka | H04N 5/2312 348/364 |
| 2008/0084483 A1* | 4/2008 | Kusaka | H04N 5/2312 348/222.1 |
| 2010/0182489 A1* | 7/2010 | Kim | G03B 13/36 348/345 |
| 2011/0058070 A1 | 3/2011 | Awazu | |
| 2012/0188425 A1 | 7/2012 | Kita | |
| 2012/0293706 A1 | 11/2012 | Usui | |
| 2014/0285685 A1* | 9/2014 | Theuwissen | H04N 5/23212 348/229.1 |
| 2014/0347532 A1* | 11/2014 | Kang | H04N 5/351 348/294 |
| 2015/0163434 A1* | 6/2015 | Ishibashi | G02B 7/34 348/66 |
| 2015/0181096 A1* | 6/2015 | Kasai | H04N 5/23296 348/362 |
| 2015/0181102 A1* | 6/2015 | Oda | H04N 5/243 348/229.1 |

FOREIGN PATENT DOCUMENTS

| | | |
|---|---|---|
| JP | 2008-187614 | 8/2008 |
| JP | 2009-109623 | 5/2009 |
| JP | 2010-054968 | 3/2010 |

* cited by examiner

*Primary Examiner* — Timothy J Henn
(74) *Attorney, Agent, or Firm* — F. Chau & Associates, LLC

(57) ABSTRACT

A method and apparatus performing scene-adaptive auto-focusing for image capture with a variable-focus lens. The array of color pixels includes an array of half-covered light sensors to obtain lens-focus state information. The exposure time of the plurality of partially-covered light sensors is dynamically selected as long-exposure or short-exposure, based upon a current measurement of a property (e.g., brightness, or color-specific brightness) of a selected region of interest within a scene to be captured by the array. Then, focus state information corresponding to the selected region of interest is obtained by capturing light from the selected region of interest with first and second partially-covered light sensors. The exposure time of the partially-covered light sensors can be changed based on whether the brightness is greater than a predetermined threshold value.

20 Claims, 14 Drawing Sheets

Figure 1: Bayer pattern for color image acquisition. The letters R,G,B denote pixels acquiring the red, green and blue channels respectively.

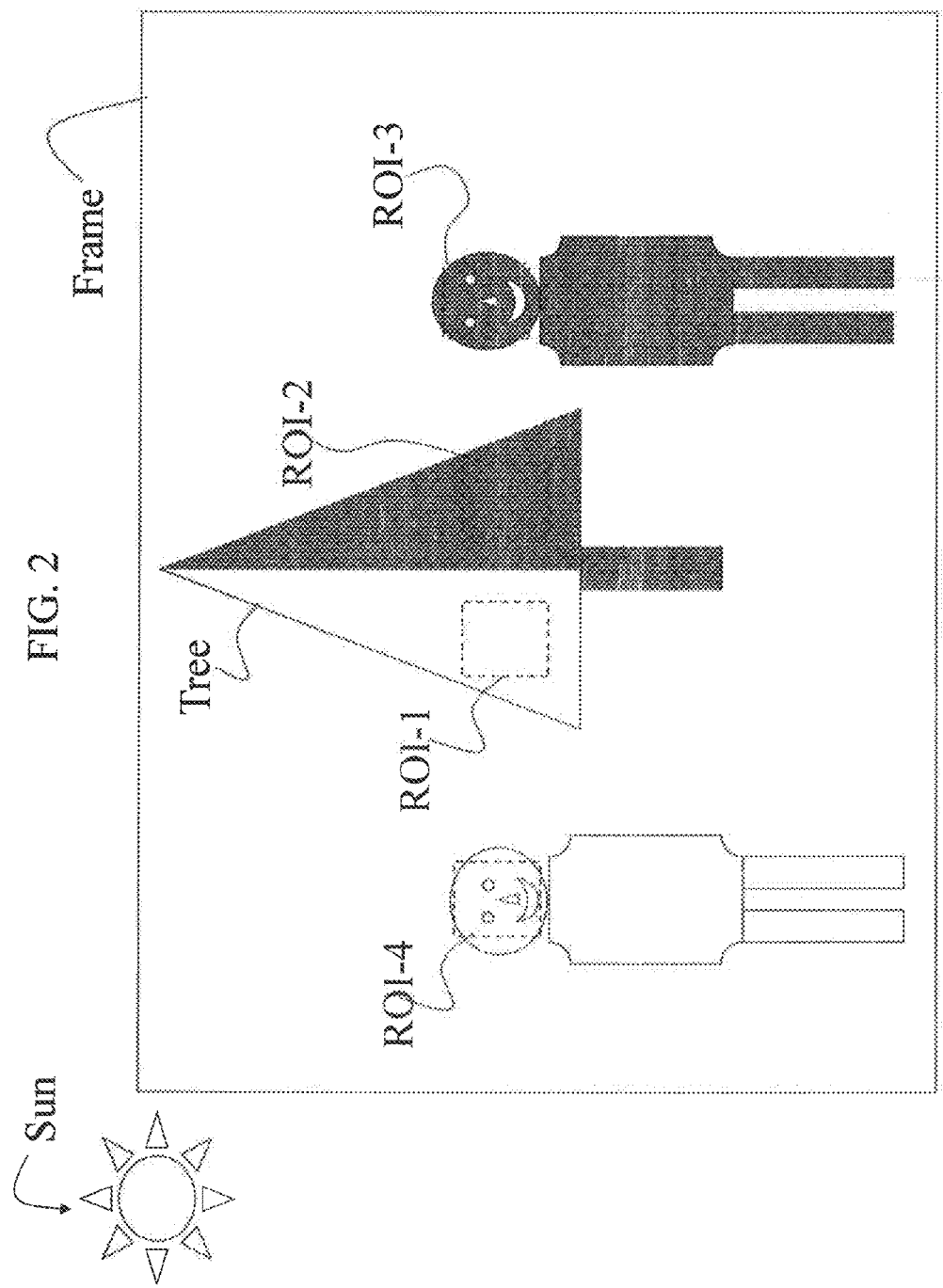

FIG. 3A
(FD-sensel Exposure Mode 1)

FIG. 3B
(FD-sensel Exposure Mode 2)

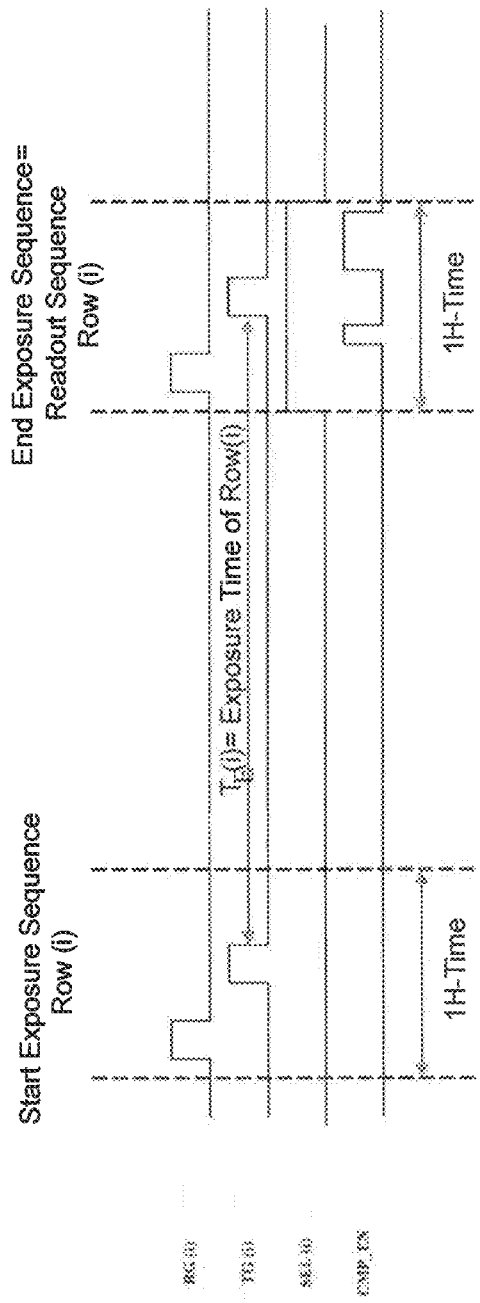

FIG. 7A
(FD-sensel Exposure Mode 1)

FIG. 7B
(FD-sensel Exposure Mode 2)

(FD-sensel Mode 1)

(FD-sensel Mode 2)

FIG. 9A
(FD-sensel Mode 1)

FIG. 9B
(FD-sensel Mode 2)

2-Shared Pixel Boundary

CIRCUIT AND METHOD PROVIDING WIDE DYNAMIC-RANGE OPERATION OF AUTO-FOCUS(AF) FOCUS STATE SENSOR ELEMENTS, DIGITAL IMAGING DEVICE, AND COMPUTER SYSTEM INCLUDING SAME

TECHNICAL FIELD

Exemplary embodiments relate to an image sensing apparatus, and more particularly to a digital image pixel array including Focus state Detecting sensor elements (FDels) and a circuit and method of operating the same with wide dynamic range are provided.

DISCUSSION OF THE RELATED ART

Sensors sense a predetermined state of an object or a selected portion thereof, and convert the sensed results to an electric signal to provide information about the object. For example, the sensors may include a light sensor (e.g., detecting luminance as detected through a selected color filter of R, G, or B), a temperature sensor (e.g., an IR sensor), a pressure sensor, a depth sensor (e.g., a time-of-flight (ToF) depth sensors, using what are called Phase-Detection (PD) sensors), or a focus-state detection sensor element, hereinafter referred to as FD sensels, or FDels) etc.

A digital camera employs an array of light sensors based on photo-diodes (PD) and floating diffusions (FD) to measure light filtered by Red (R), Green (G) and Blue (B) color filters arranged in a Bayer pattern, to capture a multitude of picture elements (known as "pixels") which together comprise a frame and enable the display an image captured from the scene (e.g., on a LCD display panel). FIG. 1 is a diagram showing a conventional Bayer pattern arrangement of Red (R), Blue (B), and Green (G) color filters for filtering light to be measured by a corresponding array of photo-diode based light sensors configured to capture an image of a scene and to generate color picture element (pixels) data corresponding to that scene.

Within a typical digital camera the light from the scene passes through an optical lens of the camera controlled by an auto-focus circuit and motor that automatically adjusts the distance between the planar array of light sensors (with color filters) and the lens based on the detected distance between an object of interest within the scene and the lens. This application incorporates by reference U.S. Pat. No. 8,606,095, assigned to Samsung, the entire contents of which are incorporated by reference herein as if fully set forth herein. U.S. Pat. No. 8,606,095 describes an exemplary circuit, mechanism, and operation of an auto-focus (AF) feature of a digital camera module.

Recently, sensor elements (sensels) have been disclosed that enable the integration of focus state detection sensor elements (FD) onto the same substrate and using the same readout circuit that comprises the color-filtered light sensors (color pixels). This application incorporates by reference the US Patent Application No. 20110058070 of Awazu, filed Sep. 8, 2010 the entire contents of which are incorporated by reference herein as if fully set forth herein.

The application 20110058070 discloses how to manufacture a digital image capture device including an array including light sensing elements of a first and second group, the elements of the first group including color-filtered light sensors (pixels), the elements of the second group including FD sensels for "phase difference" (focus state) detection, the image pickup element configured to be capable of independently reading out first and second image signals from the light sensing elements of the first and second groups. The 20110058070 Application also discloses how to manufacture a digital image capture device including an automatic focus system including a lens-focus control device configured to perform a lens-focus adjustment by moving an imaging lens so as to reduce the amount of defocus as calculated from information obtained from the second group including FD sensels.

In order to shorten Auto Focus (AF) time, regular color pixels (e.g., green color pixels) in a Bayer pattern array may be physically changed to be half covered by completely opaque filter (e.g., metal). Pairs of light sensors of FD sensels are covered in opposite orientations, usually corresponding to left-and-right (or up and down). These half-covered light sensors are sometimes referred as Auto Focus 'Phase Detection' (AF PD) sensor elements (AF sensels). Hereinafter, they shall be referred to as Focus state Detection sensor elements (FDels, or FD). The FDels may be read our and/or processed separately than the remaining color pixels and the FDels provide distance-related information indicating the current focus state of their portion of a frame scene.

SUMMARY

An aspect of the inventive concept provides a method of adaptive auto-focusing of an image capture device, having a lens and an array of light sensors including a plurality of the light sensors partially-covered to obtain lens-focus state information, the method comprising: setting the exposure time of the plurality of partially-covered light sensors, as long-exposure or short-exposure, based upon a measurement of a currently-detected property (e.g., brightness, or color-specific brightness) of a selected region of interest within a scene to be captured by the array; and obtaining focus state information corresponding to the selected region of interest by capturing light from the selected region of interest with first and second partially-covered light sensors, among the plurality of partially-covered light sensors, operating with the set exposure time.

In an exemplary embodiment, the exposure time of first and second partially-covered light sensors is set by: changing the exposure time from a default long-exposure time to the short-exposure if the measurement of the currently-detected property (e.g., brightness) is greater than a predetermined threshold value; and leaving the exposure time at the default long-exposure time if the currently-detected property is less than the predetermined threshold value.

The method may further comprise performing an AutoFocus algorithm for focusing the lens of the image capture device upon the selected region of interest based upon obtained focus state information corresponding to the selected region of interest.

The method may further comprise focusing the lens of the image capture device upon the selected region of interest based upon obtained focus state information corresponding to the focus state (or the defocus detected) of the selected region of interest.

In an preferred embodiment, the currently-detected property of a selected region of interest within a scene is the brightness of the selected region of interest. The currently-detected property of the selected region of interest within the scene may be the brightness of the selected region of interest as detected by at least one of the first and second partially-covered light sensors. The currently-detected property of the selected region of interest may be indicated by the saturation state of at least one of the first and second partially-covered light sensors. The currently-detected property of the selected region of interest may be indicated by the saturation state of at least one of the first and second partially-covered light sensors while they are operating with a long-exposure time. The currently-detected property of the selected region of interest within the scene may be the brightness of the selected region of interest as detected by at least one of a R, G or B color-filtered light sensor among the array of light sensors. The currently-detected property of the selected region of interest within the scene may be the brightness of the selected region of interest as detected by at least one of each of the R, G or B color-filtered pixels among the array of light sensors.

While the currently-detected property of the selected region of interest is being detected, the scene can be captured as a whole frame by the array.

While the currently-detected property of the selected region of interest is being detected, only a portion of the light sensors of the array that are capturing light from the region of interest need be read-out from the array and processed.

While the currently-detected property of the selected region of interest is being detected, the portion of the light sensors of the array that are read-out from the array can be whole-rows of a section of rows of light sensors that include the light sensors of the array that are capturing light from the region of interest.

An aspect of the inventive concept provides an imaging apparatus comprising: an image sensor including a light sensor array including a first plurality of picture elements (pixels) and a plurality of focus state detecting (sensing) elements (FDels), wherein each of the pixels and each of the FDels includes a photodiode; a lens configured to focus light from a scene onto the array for capturing a frame; a lens-focus controller configured to control the focus state of the lens relative to the array and relative to a first region of the scene based on a lens-control signal; a scene-condition calculator for calculating a selected condition of the first selected portion of the frame captured from the first region of the scene; a mode selector. The mode selector is configured to select one of the first and second modes of the image sensor based on the scene-condition calculation. In the first mode, the FDels in the array are exposed for a longer exposure time than the first plurality of pixels. In the second mode, the FDels in the array are exposed for a shorter exposure time than the first plurality of picture elements pixels.

The selected scene-condition is preferably brightness, and the scene-condition calculator includes an exposure calculator for calculating the brightness of the first selected portion of the frame. Thus the mode selector selects one of the first and second modes of the image sensor based on the calculated brightness, wherein if the calculated brightness is greater than a predetermined brightness threshold, the mode selector selects the second mode.

In a preferred embodiment, the apparatus further includes a second plurality of picture elements (pixels) in the same array, each of the first plurality of pixels and the second plurality of pixels includes color-filtered pixels (e.g., arranged in the same Bayer pattern as the a first plurality of pixels). In an exemplary embodiment, in the first mode, the FDels and the second plurality of pixels are exposed for a longer exposure time than the first plurality of pixels.

If a portion of the first plurality of pixels and the second plurality of pixels and the FDels are situated in accordance with various exemplary embodiments of the invention, within one pair of vertically adjacent rows of the array, they may be controlled with a 2-shared pixel wiring pattern. The first plurality of pixels and the second plurality of pixels and the FDels can be configured and wired to operate in a Mosaic Multiple Exposure array pattern.

An aspect of the inventive concept provides a computing system comprising any embodiment of the imaging apparatus above described. Such a computing system additionally includes a central processing unit (CPU) configured to control the imaging apparatus, and configured to receive image data from the imaging apparatus. The CPU may additionally receive metadata of the image data signals such as focus state information (e.g., FDel data or AF lens-control signal data) pertaining to one or more regions of interest (ROI), ROI-data defining ROIs within a scene, scene-recognition data (e.g., face recognition/location data) distance/proximity data for objects in the scene, camera position/jitter information, camera location (e.g., GPS longitude, latitude, elevation) data, camera direction (e.g., compass, angle-of-attack) data, scene location data, etc.

The computing system can be implemented as including or as part of a digital camera, cellphone, laptop computer, autonomous vehicle, autonomous aircraft, smart-munition, robot, etcetera or any device that captures image data. The computing system can a mobile system including a battery.

The inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the inventive concept. The drawings and description are to be regarded as illustrative in nature and not restrictive. Like reference numerals designate like elements throughout the specification. Further, a detailed description of the related art elements, circuits, or blocks that is known to persons skilled in the art is omitted.

In the drawings, the relative area or thickness of layers, filter, elements, wires, regions, etc., may be exaggerated for clarity of illustration. Like reference numerals designate like elements throughout the specification. It will be understood that when an element region, or substrate is referred to as being "on" or "connected" to another element, it may be directly on or connected the other element or intervening elements may also be present. In contrast, when an element is referred to as being "directly on" another element, there are no intervening elements present. In the modified Bayer pattern array diagrams of each of FIGS. 3A, 3B, 7A, 7B, 8A, 8B, 9A, 9B, capital letters (FD, R, G, B) indicate that the pixel or sensel is operated in long (longer) exposure time mode, and lowercase letters (fd, r, g, b) indicate that the pixel or sensel is being operated in short (shorter) exposure time mode. The letters r/R, g/G, and b/B indicate the pixels that are covered with red, green and blue color filters respectively. The letters FD/fd indicate the sensels that are lens Focus state Detection sensels (FDels), which are partially-covered (e.g., half covered). Where combined letters g/G and fd/FD are included in any diagram, but letters r/R and b/B are omitted for clarity of illustration, the unlabeled pixels are color-filtered pixels that can be either red or blue, as may be selected by a designer. And, in any diagram herein, the red and blue color filter applied to pixels labeled by letters r/R and b/B may be swapped, as may be selected by a designer. In various alternative embodiments, pixels designated green g/G may be replaced with red or blue color filtered pixels to be labeled by letters r/R and b/B. In various exemplary embodiments shown in the figures, FDels are substitutionally placed in the expected-positions of green pixels as those expected-positions are defined in a Bayer pattern. But the inventive concept is not limited to the exemplary embodiments. In various alternative embodiments, FDels may be substitutionally placed in the expected-positions of any one or more of green, red, or blue color pixels as those expected-positions are defined in a conventional or modified Bayer pattern. In various alternative embodiments, FDels may be positioned in interstitial positions between the expected-positions of any one or more of green, red, or blue color pixels as those expected-positions are defined in a conventional or modified Bayer pattern.

BRIEF DESCRIPTION OF THE DRAWINGS

FIG. 2 is a diagram showing an exemplary scene to be adaptively auto-focused upon and captured by a digital camera according to exemplary embodiments of the inventive concept;

FIGS. 3A and 3B are diagrams of two modes of Bayer pattern of a color pixel array modified according to an exemplary embodiment of the inventive concept, to include dual-mode focus state detection sensor elements (FDels) supporting the method of FIG. 4A of adaptive auto-focusing upon a scene (e.g., the scene of FIG. 2);

FIG. 6 is a timing diagram illustrating the control and operation of light sensors in Row(i) of an exemplary array implemented as shown in FIG. 3 and in FIG. 5, according to the method of FIGS. 4A and 4B;

FIGS. 7A and 7B is a diagram of Bayer pattern of a color pixel array modified according to an exemplary embodiment of the inventive concept, to include dual-mode focus state detection sensor elements (FDels) supporting the method of FIG. 4A of adaptive auto-focusing upon a scene (e.g., the scene of FIG. 2);

FIGS. 9A and 9B is a diagram of Bayer pattern of a color pixel array modified according to an exemplary embodiment of the inventive concept, to include dual-mode focus state detection sensor elements (FDels) supporting the method of FIG. 4A of adaptive auto-focusing upon a scene (e.g., the scene of FIG. 2);

DETAILED DESCRIPTION OF THE EXEMPLARY EMBODIMENTS

FIG. 2 is a diagram showing an exemplary scene to be adaptively focused upon and captured by a digital camera according to an exemplary embodiment of the inventive concept. The scene of FIG. 2 includes the Sun, a Tree and two persons. The Tree is exposed to the Sun's light on one (left) side and is brightly illuminated on that (left) side, and is shaded from the sun on the other (right) side. Likewise, a first person on the left of the tree is exposed to the Sun's light is brightly illuminated, while the second person on the right side of the tree is in the shade of the tree and is less brightly illuminated. A Frame to be captured by a digital camera operated and positioned by a user (not shown) includes regions of interest ROI-1, ROI-2, ROI-3 and ROI-4. Regions of interest ROI-1 and ROI-4 are more brightly illuminated than regions of interest ROI-2 and ROI-3. Therefore, a Focus state Detection sensor element (FDel) in the digital camera directed to either one of regions of interest ROI-1 or ROI-4 may become "saturated" sooner than a FDel directed to either one of regions of interest ROI-2 or ROI-3. Thus, the performance of a conventional AutoFocus system relying upon FDels integrated within the pixel array of the digital camera may be adversely affected by variations in the illumination of objects within a scene.

Figure 1:
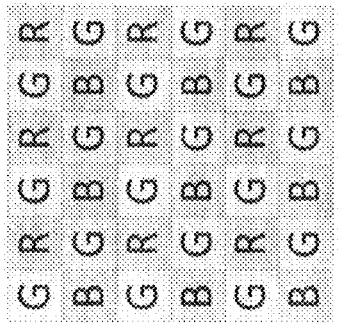
FIG. 1 is a diagram showing a conventional Bayer pattern arrangement of Red (R), Blue (B), and Green (G) color filters for filtering light to be measured by a corresponding array of photo-diode based light sensors configured to capture an image and to generate color picture element (pixels) data.
Figure 4A:
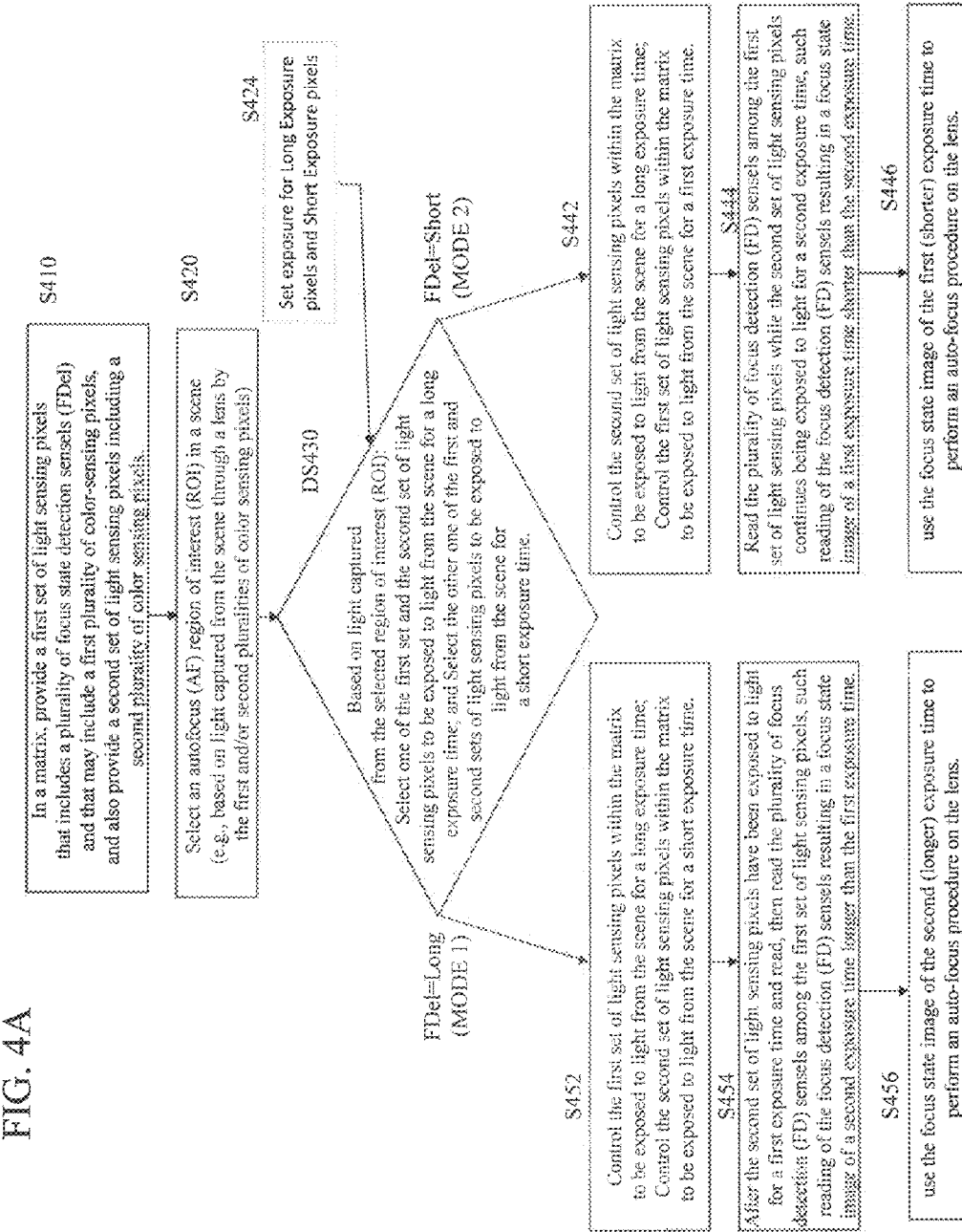
FIG. 4A is a flow chart of a method of adaptive auto-focusing upon the scene of FIG. 2, according to an exemplary embodiment of the inventive concept, employing dual-mode focus state detection sensor elements (FDels) arranged or operated according to any exemplary embodiment herein.

FIGS. 3A and 3B show two modes of Bayer pattern of a color pixel array (e.g., an array of color-filtered light sensors) modified according to an exemplary embodiment of the inventive concept, to include a plurality of dual-mode focus state detection sensor elements (FDels; labeled "FD" and "fd") supporting the method of FIG. 4A of adaptive auto-focusing (AAF) upon a scene (e.g., the scene of FIG. 2). In FIGS. 3A and 3B, a subset of the green G/g color pixels have been modified (e.g., the color filter is omitted, and a half-cover is applied over the light sensor; A microlens, not shown, may also be added) to become dual-mode focus state detection sensor elements (FDels; labeled "FD" and "fd").

In order to shorten Auto Focus (AF), some pixels among the light sensor array are modified to become FDels such that the photodiodes of FDels are half covered (e.g., by metal), and usually pairs of FDels are covered in different (e.g., opposite) orientations. These half-covered light sensors are sometimes referred as Auto Focus Phase Detection (AF PD) pixels, and are referred to as lens Focus state Detection sensels (FDels) herein. The FDels supply information about the current focus status of the lens by detecting a difference in the amount of light received by differently half-covered photodiodes. In the related art, the FDels are conventionally controlled to always operate in a short exposure time (e.g., to avoid saturation of FDels). Thus, in the related art the exposure time of FDels is fixed or predetermined, (e.g., according to a design decision of a designer) based on a physical limitation and the exposure time is not dynamically changed according to the content of the scene. An aspect of the inventive concept provides a method (see FIGS. 4A & 4B) to dynamically select or change the exposure time of FDels for purposes of optimizing Auto Focus (AF), based on the content of the current scene.

FIG. 4A is a flowchart of a method of adaptive auto-focusing upon the scene of FIG. 2, according to an exemplary embodiment of the inventive concept, employing dual-mode focus state detection sensor elements (FDels) arranged or operated according to any exemplary embodiment herein.

According to an aspect of the inventive concept, switching FDels (and operatively connected color pixels) between long and short exposure time modes is performed dynamically according to frame (scene) content and/or focus requirements. Thus, an aspect of the inventive concept can protect the FDels from saturation and enables FDels to operate together with either a low-sensitivity group of color pixels (i.e., short exposure time) or with a high-sensitivity (long exposure time) group of color pixels. In some scenes the FDels may be automatically (or manually) switched from long exposure time to short-exposure time, or vice versa, even while the set of all color filtered pixels in the array are providing both long-exposure and short-exposure image data. The exposure time mode of FDels is switchable automatically according to dynamically detected image content, while the availability of long-exposure and short-exposure RGB color image data is undiminished.

In FIGS. 3A and 3B, in each mode, one group of light sensors (e.g., color pixels and FDels in Mode 1) is operated with a long exposure time while a second group of light sensors (e.g., color pixels only, in Mode 1) is operated with a short exposure time. The first group of light sensors (e.g., uppercase G and FD in mode 1 FIG. 3A) physically includes FDels for providing lens focus state information for AutoFocus (AF). The second group of light sensors (e.g., lowercase g in Mode 1 FIG. 3A) does not physically include FDels. Both the first group and the second group of light sensors includes color filtered pixels. In various alternative embodiments that include additional control wires, the FDels could be operated (e.g., read-out) separately from the operation of the color pixels. In the exemplary embodiment of FIGS. 3A and 3B, light sensors are grouped and controlled as whole rows, and every light sensor in a row may be controlled by the same set of control wires (not shown in FIG. 3A. see e.g. FIG. 5). Thus, as shown in FIG. 3A, while FDels (FD) in the first group (e.g., first row) are operating in their first mode (long exposure time mode), all the color pixels (G as shown, and R & B not shown) of the first group (e.g., first row) are also operating in the long exposure time mode, and all color pixels (g as shown, and r & b not shown) of the second group (e.g., second row) are operating in the short exposure time mode. And, as shown in FIG. 3B, while FDels (fd) in the first group (e.g., first row) are operating in their second mode (short exposure time mode), all the color pixels (g as shown, and r & b not shown) of the first group (e.g., first row) are also operating in the short exposure time mode, and all color pixels (G as shown, and R & B not shown) of the second group (e.g., second row) are operating in the long exposure time mode. Thus, in exemplary embodiments, at least two groups of pixels are operated in two different exposure modes (with different exposure times)—one group being operated in a long exposure time mode while other operated is being operated in a short exposure time mode—and color pixel image data is always available in both modes in all parts of the frame. FDels for focus state detection can all be placed in one of the two sets. The exposure time mode (long exposure/short exposure) of each group of pixels is switchable according to content of scene/image (and requirement for focusing).

The performance of an autofocus (AF) algorithm may be optimized for a selection among the regions of interest in bright areas of the scene (e.g., ROI-4 in FIG. 2) and in the dark areas of the scene. The autofocus (AF) algorithm can be sequentially optimized for different regions of interest, such as being optimized for a bright area of the scene (e.g., ROI-4 in FIG. 2) in a first frame, and being optimized for a dark area of the scene (e.g., ROI-3 in FIG. 2) in a second frame. A stitching algorithm may then be employed to combine portions of the first frame and the second frame together to present an optimal combination image of the scene, having neither too-bright portions nor too-dark portions. The resulting combination image of the scene would also have optimal focus upon the bright and the dark regions of interest.

In the exemplary embodiment of FIGS. 3A and 3B even though the first group and second group of pixels can operate with different time exposure modes (one is long exposed while the other is short exposed, and vice versa), because vertically adjacent groups (rows) can be independently controlled, both groups can be operated to have the same exposure time in order to work in single exposure mode. A low sensitivity (short to exposure) frame or field can be sampled at a higher frame rate than a high sensitivity (long exposure) frame or field. The use of a two exposure mode method to capture both high sensitivity color pixels (long exposure) and low sensitivity color pixels (short exposure) interleaved in a single frame is supported (e.g., to produce a combination image using interpolations using two fields of a single frame). A first frame or field can be used for display purposes where the other frame or field is used for "behind-the-scene" purposes such as Auto-Focus/Auto-Exposure/Auto-White-Balance, etc.

Referring to FIGS. 3A, 3B and 4A, a method and apparatus according to an exemplary embodiment of the inventive concept will, upon a selection of a region of interest ROI within a scene (step S420), dynamically set (DS430) the exposure time (i.e., long-mode or short-mode) of focus state detection sensor elements (FDels) directed to (at least) sense that selected region of interest ROI so as to obtain and use focus state information that is unaffected by saturation and which has a wide dynamic range (WDR). Whereupon, the adaptively obtained focus state information can be used in an AutoFocus algorithm known to persons skilled in the art or to become known thereto hereafter, to focus the lens of the camera (e.g., to focus the lens at the distance of the selected region of interest).

An apparatus supporting the method of FIG. 4A includes an array of light sensors including some that are half-masked to operate as FDels, wherein each of the FDels can be dynamically controlled to be exposed in a long-exposure mode (Mode 1) as shown for example in FIG. 3A or in a short-exposure mode (Mode 2) as shown for example in FIG. 3B. Various other exemplary implementations of an array of light sensors including dual-mode FDels, that will support the method of FIG. 4A of adaptive auto-focusing upon a scene (e.g., the scene of FIG. 2), are shown in FIGS. 7A and 7B, 8A and 8B, 9A and 9B, and 11.

Referring to the method of FIG. 4A, the region of interest to be selected in step S420 can be automatically selected, such as by known methods of face detection, eye detection, smile detection, or any other method of automatic detection and selection. Alternatively, the region of interest to be selected in step S420 can be automatically selected based on its relative position within the frame (e.g. the center of the frame). Alternatively, the region of interest to be selected in step S420 can be manually or verbally or otherwise selected by a user, based on for example a detection of the user's finger-touch on a portion of a display (showing the scene) integrated in the digital camera, voice commands (e.g., "Camera. Focus on Max's face."), or based on eye-movement type detection of the point on such display or in the scene at which the user is looking.

Figure 4B:
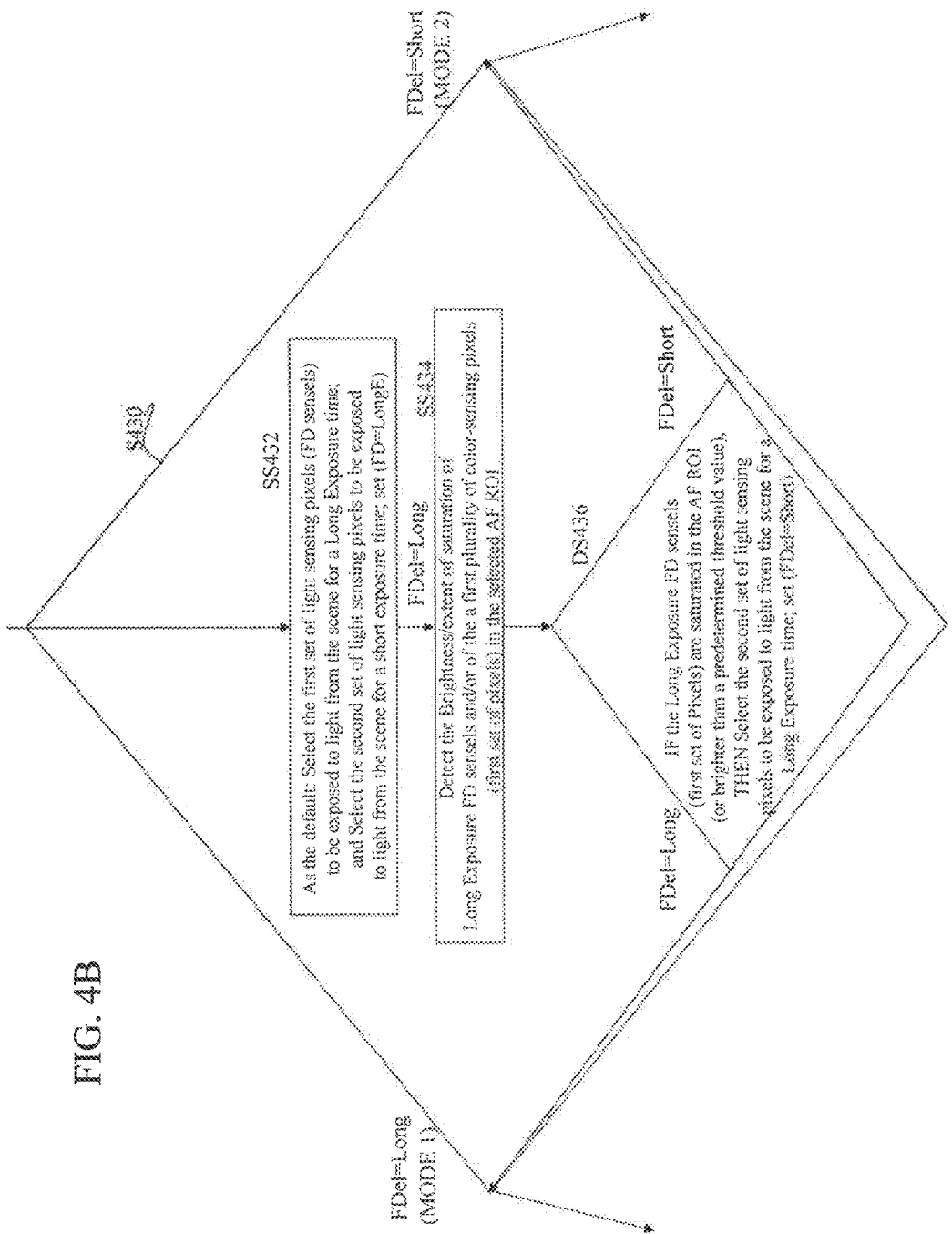
FIG. 4B is a flow chart detailing an exemplary implementation of the decision step DS430 of FIG. 4A for dynamically selecting the current mode of operation (e.g., short or long) of corresponding dual-mode focus state detection sensor elements (FDels) based upon the content of a selected region of interest (ROI) within a scene (e.g., in the scene of FIG. 2), according to an exemplary embodiment of the inventive concept.

FIG. 4B is a flow chart detailing an exemplary implementation of the decision step DS430 of the method of FIG. 4A for dynamically selecting the current mode of operation (e.g., MODE 1, FDel=long; or MODE 2, FDel=short) of corresponding dual-mode focus state detection sensor elements (FDels) based upon the content of a selected region of interest (ROI) within a scene (e.g., in the scene of FIG. 2), according to an exemplary embodiment of the inventive concept.

Step S424 is a setup or design step wherein the actual time-length of each exposure mode (long/short) is set.

As the default, in step SubStep 432 the first set of light sensing pixels (FD sensels) to be exposed to light from the scene are selected for a Long Exposure time; and the second set of light sensing pixels to be exposed to light from the scene are selected for a short exposure time; set (FDel=Long). In SubStep 434, the extent of saturation (brightness) of Long Exposure FDels and/or of the a first plurality of color-sensing pixels (first set of pixels) in the selected AF ROI are detected.

If the selected (S420) region of interest (ROI) is brightly illuminated such that a long-exposed (e.g., long-exposed by default in SubStep 432) FDels in its subfield of view (sFOV) are saturated or some may be saturated to a predetermined degree (e.g., have an average brightness greater than a predetermined brightness threshold), then the decision (decision step DS436) is made to control that FDel and/or adjacent FDels and/or all FDels in the array, to be short-exposed, or shorter-exposed (FD=Short branch of decision step DS436 and DS430). And, if the selected (S420) region of interest ROI is not so brightly illuminated such that a long-exposed (e.g., long-exposed by default) FDel in its subfield of view (sFOV) becomes saturated or would become saturated to the predetermined degree, then the decision DS436 is made to control that FDel and/or adjacent FDels and/or all FDels to be or to remain long-exposed (FD=Long branch of decision step DS436 and DS430). Thus, the mode of operation of FDels providing focus state detection information to an AutoFocus lens-control algorithm will depend upon a dynamic detection of a current property (e.g., luminance/brightness of each frame) of a selected region of interest ROI. The dynamic detection of a predetermined property (e.g., luminance/brightness) of a selected region of interest ROI can be based on light captured by either the FDels or the color pixels (R, G B) directed at that region of interest ROI, or from both the FDels and the color pixels, or from any subset thereof.

In step S452 (FD=Long branch of decision step DS436 and DS430), the first set to of light sensing pixels within the matrix is controlled to be exposed to light from the scene for a long exposure time; and, the second set of light sensing pixels within the matrix is controlled to be exposed to light from the scene for a short exposure time. Then, in step S454, after the second set of light sensing pixels have been exposed to light for a first exposure time and read, the plurality of focus detection (FD) sensels among the first set of light sensing pixels are read, with such reading of the focus detection (FD) sensels resulting in a focus state image of a second exposure time longer than the first exposure time. Then in step S456, the focus state image of the second (longer) exposure time is used to perform an (adaptive) auto-focus procedure on the lens.

In step S442 (FD=Short branch of decision step DS436 and DS430), the second set of light sensing pixels within the matrix is controlled to be exposed to light from the scene for a long exposure time; and, the first set of light sensing pixels within the matrix is controlled to be exposed to light from the scene for a first exposure time (the first exposure time being shorter than the second exposure time). Then in step S444, the plurality of focus detection (FD) sensels among the first set of light sensing pixels are read while the second set of light sensing pixels continues being exposed to light for a second exposure time, such reading of the focus detection (FD) sensels resulting in a focus state image of the first exposure time shorter than the second exposure time. And then, in step S446, the focus state image of the first (shorter) exposure time is used to perform an auto-focus procedure on the lens.

Two sequential frames may be captured of the same field of view (i.e., of the same scene). The first frame may be used for live video, and for detection of the current property of a selected region of interest. Before capturing the second frame, the exposure times of the FDels in the second frame can be changed in the background (e.g., while the first frame is being displayed and or stored) without affecting the user experience. Alternatively, in a still photo mode, the first frame may be used for still or video display on the digital camera while a region of interest is being selected, and/or may be used for detection of the current property of a selected region of interest, and then be discarded after the final (second or third) frame is captured using unsaturated lens focus state information.

Figure 5:
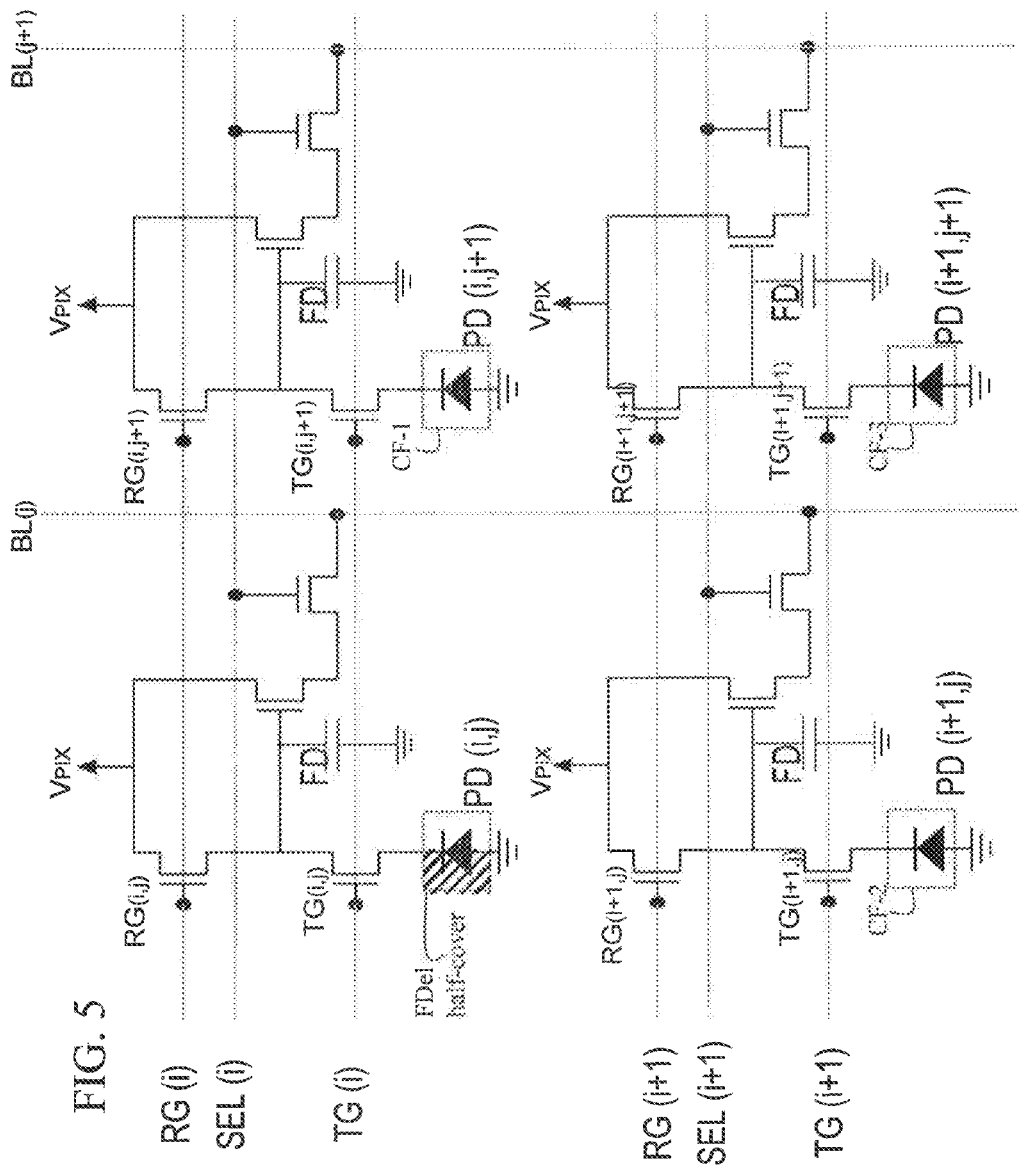
FIG. 5 is a circuit diagram of a portion of an exemplary array of photo-diodes (PD) based image sensors to be filtered/covered and operated according to the method of FIG. 4A.

FIG. 5 is a circuit diagram of a portion of an exemplary array of photo-diodes (PD) based image sensors to be filtered/covered and operated according to according to the method of FIG. 4A. Each of the Auto Focus (AF) sensels (FDels) can be fabricated and formed in the same as in the digital cameras of the related art. They FDels are made physically different from their adjacent pixels by the addition of a metal cover to half of the pixel (and in various alternative embodiments, by the omission of a color-filter) (and in various alternative embodiments, by the addition of a micro-lens). The color pixels have color filters (CF-1, CF-2, CF-3) over their photodiode (PD). The FDel (sensel) has a metal half-cover in the place of (or in addition to) a color filter.

Figure 10:
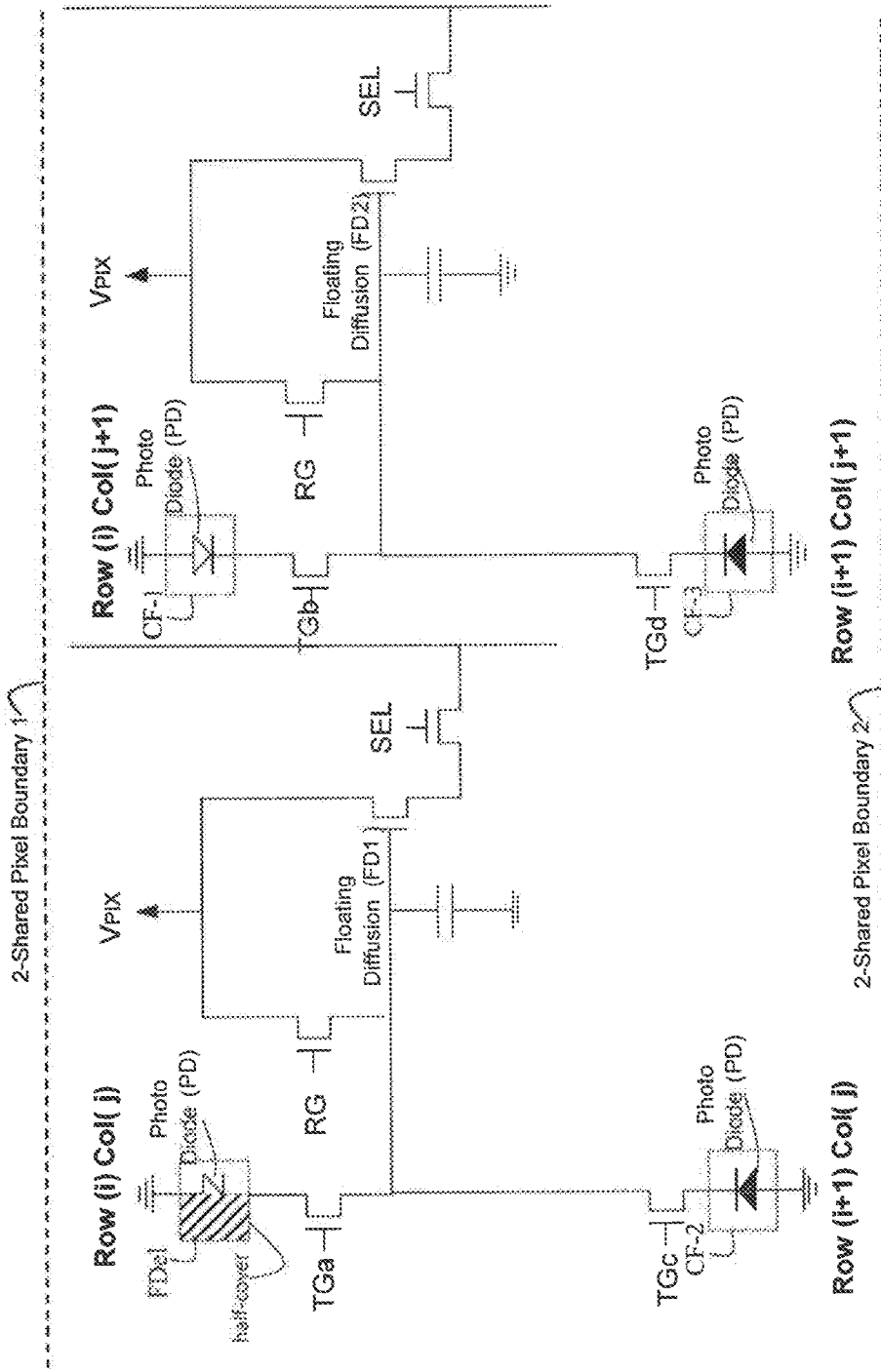
FIG. 10 is a circuit diagram of a portion of an exemplary array of photo-diode (PD) based image sensors to be filtered/covered and operated according to according to the method of FIG. 4A, and controlled in a 2-shared pixel (2SP) manner.

In the conventional pixel structure, each pixel/FDel has 4 transistors and 3 controllable gates: In the Electrical Rolling Shutter (ERS) the light sensors in each row share same control logic (and A/D conversion logic). In this structure there are 4 transistors and 3 control lines per light sensor, being connected to three gate types:

A Transfer Gate (TG) to transfer charge that was collected during exposure from a Photo Diode (PD) to a Floating Diffusion (labeled "FD" in FIGS. 5 and 10. "Fdiff" in FIG. 11) capacitor;

A Reset Gate (RG) to reset the FDels (e.g., before opening the TG gate).

A Select Gate (SEL) to output FDel data through a bit-line (vertical lines in FIG. 5) to a A/D comparator.

In various alternative embodiments, the transfer gates TG(i,j) of the FDel can be controlled with a control wire separate (independent) from wire(s) that control the transfer gates of the color-filtered (CF-1, CF-2, CF-3) pixels. In various alternative embodiments, the transfer gate TGa of the FDels can be controlled with a wire(s) separate (independent) from wire(s) that control the transfer gates TGb, TGc, TGd of the color-filtered (CF-1, CF-2, CF-3) pixels. In such multi-control implementations, all color pixels to operate with the same exposure time while the FDels operate with a different exposure time. An in such case, a first plurality of the color pixels can be operated with a first exposure time, while the second plurality of color pixels and the FDels are operated with a second exposure time. And, at various times (e.g., during the existence of predetermined scene conditions) the exposure times of the FDels can be switched from one exposure time to another exposure time.

FIG. 6 is a timing diagram illustrating the control and operation of light sensors in Row(i) of an exemplary array implemented as shown in FIG. 3 and in FIG. 5, according to the method of FIGS. 4A and 4B.

The charge in each photo diode (PD) is collected between two consecutive TG pulses. This time is referred as Integration Time or Exposure Time TE(i) of row(i). When a row i containing FDels is operated in MODE 1 (FD=long exposure), the Exposure Time TE(i) of Row(i) is long exposure. When a row i containing FDels is operated in MODE 2 (FD=short exposure), the Exposure Time TE(i) of row(i) is long exposure (while vertically adjacent row(l+1) has a exposure time TE(i+1) that is short). Thus, in different vertically adjacent rows, e.g., row(i) and row(i+1) of an exemplary array implemented as shown in FIG. 3 and in FIG. 5, the exposure time of photodiodes can be different.

In each 1H-Time period, one Row (maximum) can go through exposure sequence and in the same time, one Row (maximum) can be readout and converted to a digital value, later to be processed by an Image processor.

FIGS. 7A and 7B is a diagram of Bayer pattern of a color pixel array modified according to an exemplary embodiment of the inventive concept, to include dual-mode focus state detection sensor elements (FDels) supporting the method of FIG. 4A of adaptive auto-focusing upon a scene (e.g., the scene of FIG. 2). The array of FIGS. 7A and 7B differs from the array of FIGS. 3A and 3B in that the first group of light sensors including the FDels spans two adjacent rows (e.g., the first row and the second row) and the second group of light sensors not including the FDels spans the same two adjacent rows (e.g., the first row and the second row). Thus, within some pairs of vertically adjacent rows, the first group and second group are interlaced in the horizontal direction, whereas in FIGS. 3A and 3B, the first group and second group are only interlaced in the vertical direction. Also, in FIGS. 7A and 7B, within some pairs of vertically adjacent rows, the first group and second group are interlaced in both the vertical direction and in the horizontal direction. Thus, a 2-shared pixel control wiring scheme may be employed to implement this embodiment. The light sensors of this exemplary embodiment can be controlled using a 2-shared pixel wiring implementation, because vertically adjacent rows can be paired within a 2-shared boundary that will include an equal number of first group sensors and second group sensors. The first group and second group each contain pixels of all three colors, red, green and blue.

Figures 8A, 8B:
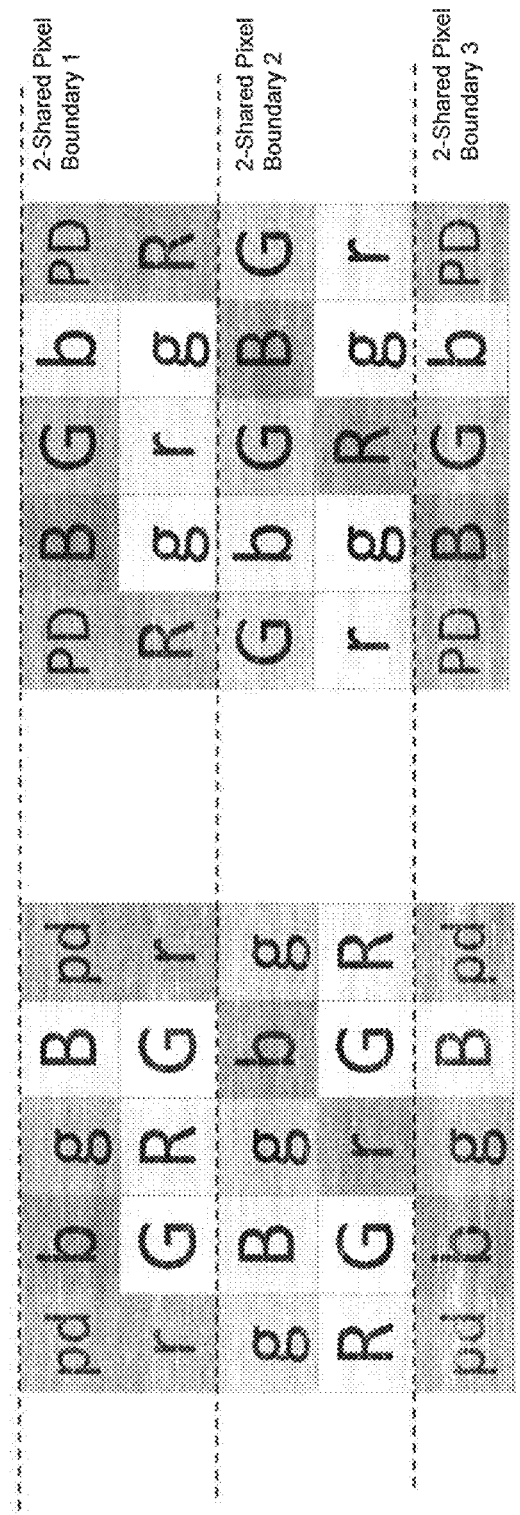
FIGS. 8A and 8B is a diagram of Bayer pattern of a color pixel array modified according to an exemplary embodiment of the inventive concept, to include dual-mode focus state detection sensor elements (FDels) supporting the method of FIG. 4A of adaptive auto-focusing upon a scene (e.g., the scene of FIG. 2)

FIGS. 8A and 8B is a diagram of Bayer pattern of a color pixel array modified as a Mosaic Multiple Exposure array according to an exemplary embodiment of the inventive concept, to include dual-mode focus state detection sensor elements (FDels) supporting the method of FIG. 4A of adaptive auto-focusing upon a scene (e.g., the scene of FIG. 2). The array of FIGS. 8A and 8B differs from the array of FIGS. 3A and 3B in that the first group of light sensors including the FDels spans two adjacent rows (e.g., the first row and the second row) and the second group of light sensors not including the FDels spans the same two adjacent rows (e.g., the first row and the second row). The light sensors of this exemplary embodiment can be controlled using a 2-shared pixel wiring implementation because each pair of vertically adjacent rows can be paired within a 2-shared boundary that will include an equal number of first group sensors and second group sensors. See also an exemplary implementation of the array of FIGS. 8A and 8B in greater detail in FIG. 11. The exposure time mode (long exposure/short exposure) of each group of pixels is switchable according to content of scene/frame/ROIs (and requirement for focusing).

Figures 9A, 9B:
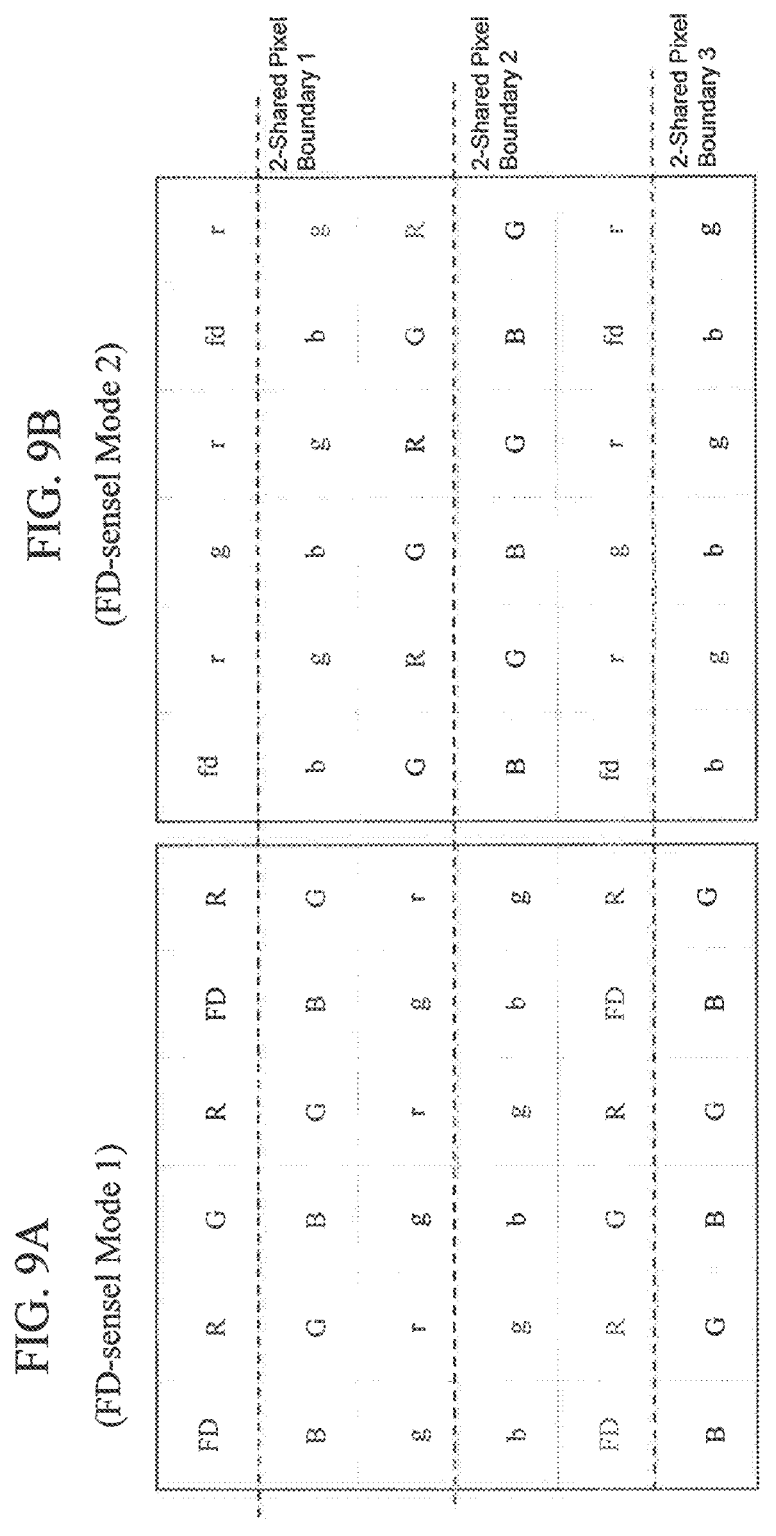

FIGS. 9A and 9B is a diagram of Bayer pattern of a color pixel array modified according to an exemplary embodiment of the inventive concept, to include dual-mode focus state detection sensor elements (FDels) supporting the method of FIG. 4A of adaptive auto-focusing upon a scene (e.g., the scene of FIG. 2). The array of FIGS. 9A and 9B differs from the array of FIGS. 3A and 3B in that the first group of light sensors including the FDels exist on two adjacent rows (e.g., the first row and the second row) and the second group of light sensors not including the FDels exist on two other adjacent rows (e.g., the third row and the fourth row). The light sensors of this exemplary embodiment can be controlled with each row independently controlled as FIGS. 3A and 3B (and can be implemented by the same circuit hardware as the array FIGS. 3A and 3B), or it may be controlled using a 2-shared pixel wiring implementation, because pairings of vertically adjacent rows exist that can be paired within a 2-shared boundary that will include an equal number of first group sensors and second group sensors.

FIG. 10 is a circuit diagram of a portion of an exemplary array of photo-diode (PD) based image sensors to be filtered/covered and operated according to according to the method of FIG. 4A, and controlled in a 2-shared pixel (2SP) manner. This 2-Shared control circuit structure may be employed to implement the arrays of FIGS. 3A and 3B, 9A and 9B, 10A and 10B. In order to reduce amount of transistors per pixel (color and FDels) and also to reduce amount of horizontally routed control lines (in order to have more noise immunity), the 2-shared pixels structure may be employed. Two photodiodes (PD) from consecutive (vertically adjacent) rows share the same control logic and therefore, there are effectively 2.5 transistors and two control lines per pixel. Two rows of pixels (or two pixels from same column in two consecutive rows) that share the same control logic are referred as being within same "2-shared pixels boundary". Exemplary positioning of 2-Shared Pixel boundaries are shown in each of FIGS. 8A-8B, 9A-9B, 10, and 11. In various embodiments of the circuit of FIG. 10, the control wiring (not shown) connected to the Transfer Gates TG (TGa, TGb, TGc, TGd) can be selected by a designer or manufacture to implement various Bayer array Long/Short patterns. For example, if both of TGa and TGb are connected alike to the same control line TG2, and if both of TGc and TGd are connected alike to the same control line TG1, then the Bayer array Long/Short patterns of FIGS. 3 and 9A-9B can be implemented using the 2-shared wire circuit structure of FIG. 10. For another example, if TGa and TGd (of different columns, and different rows) can be connected alike to the same control line TG1, while of TGb and TGc (of different columns, and different rows) are connected alike to the same control line TG2, then the Bayer array of FIGS. 8A-8B can be implemented using the 2-shared wire circuit structure of FIG. 10. For another example, if TGa and TGc (of same column, different rows) can be connected alike to the same control line TG1, while of TGb and TGd (of same column, different rows) are connected alike to the same control line TG2, then the Bayer array of FIGS. 7A-7B, 8A-8B can be implemented using the 2-shared wire circuit structure of FIG. 10. The Transfer Gates TG (TGa, TGb, TGc, TGd) can be controlled in various embodiments by two or more TG-control wires (e.g., 2-Shared Wiring).

In various alternative embodiments, the transfer gate TGa of the FDels can be controlled with a wire(s) separate (independent) from wire(s) that control the transfer gates TGb, TGc, TGd of the color-filtered (CF-1, CF-2, CF-3) pixels.

In the Mosaic Multiple exposure sequence for the pattern of FIG. 8 there are 2 processes working in parallel. Since the routing and connections of control lines is fixed by HW, there are two possible exposure patterns. A row driver for this sequence can be implemented using two row scanners, a long exposure scanner and a short exposure scanner. The long exposure scanner starts exposing 'half' of the light sensors. The short exposure scanner will complete the process by exposing the un-exposed light sensors in the row at a later time.

Figure 11:
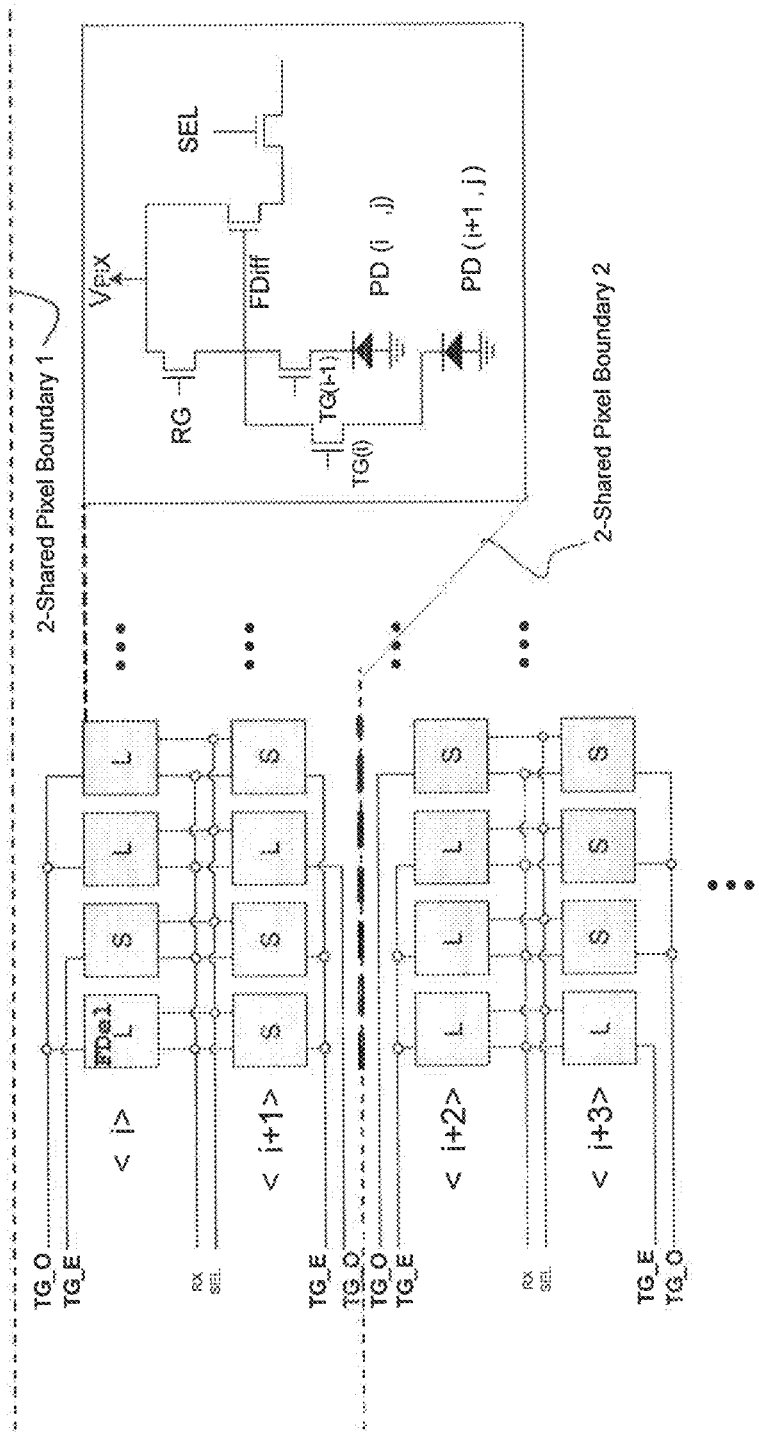
FIG. 11 is a wiring diagram, with an inset circuit diagram, of a portion of the exemplary Mosaic Multiple exposure array of FIGS. 8A and 8B, being an array of photo-diode (PD) based image sensors to be filtered/covered and operated according to according to the method of FIG. 4A, and controlled in a 2-shared pixel (2SP) manner.

FIG. 11 is a wiring diagram, with an inset circuit diagram, of a portion of the exemplary Mosaic Multiple Exposure array of FIGS. 8A and 8B, being an array of photo-diode (PD) based image sensors to be filtered/covered and operated according to according to the method of FIG. 4A, and controlled in a 2-shared pixel (2SP) manner. The Bayer pattern (color filters and FDel positions) as shown in FIGS. 8A and 8B can be assumed. This Long/Short exposure-distribution concept is called Mosaic multiple exposure. The control wiring for this pattern is more complex than that of the arrays of FIGS. 3A and 3B, 7A and 7B, or 9A and 9B because the first group sensors (including FDels) are distributed (or interlaced) both vertically and horizontally within each pair of vertically adjacent rows (within each 2-shared boundary). And, the second group sensors (not including FDels) are distributed both vertically and horizontally within each pair of vertically adjacent rows (within each 2-shared boundary), and shifting the 2-shared boundary up or down does not avoid that circumstance. However, this complexity supports a pattern that, as shown in FIGS. 8A and 8B, can disposes first group color pixels of the same color (e.g., b in FIG. 8A) and second group color pixels of the same color (e.g., B in FIG. 8A) in diagonals in the array that provides uniform and greater distance between them. This Long/Short exposure-distribution pattern can enhance the resulting image data.

In order to be able to have Wide Dynamic Range (WDR) within one frame, half of the pixels get Long exposure (marked by L in FIG. 14) and the remaining half will receive Short exposure (marked by S). The Long and Short pixels are interlaced and controlled in a special physical wire routing pattern. For this purpose two additional control lines may be added for each 2-shared pixels structure resulting in ratio of 6/2 control lines (6 controls for 2 rows of pixels). Long and Short pixel structure may be same physically, the only difference being that they should be exposed for different lengths of time (and read out at different times).

Figure 12:
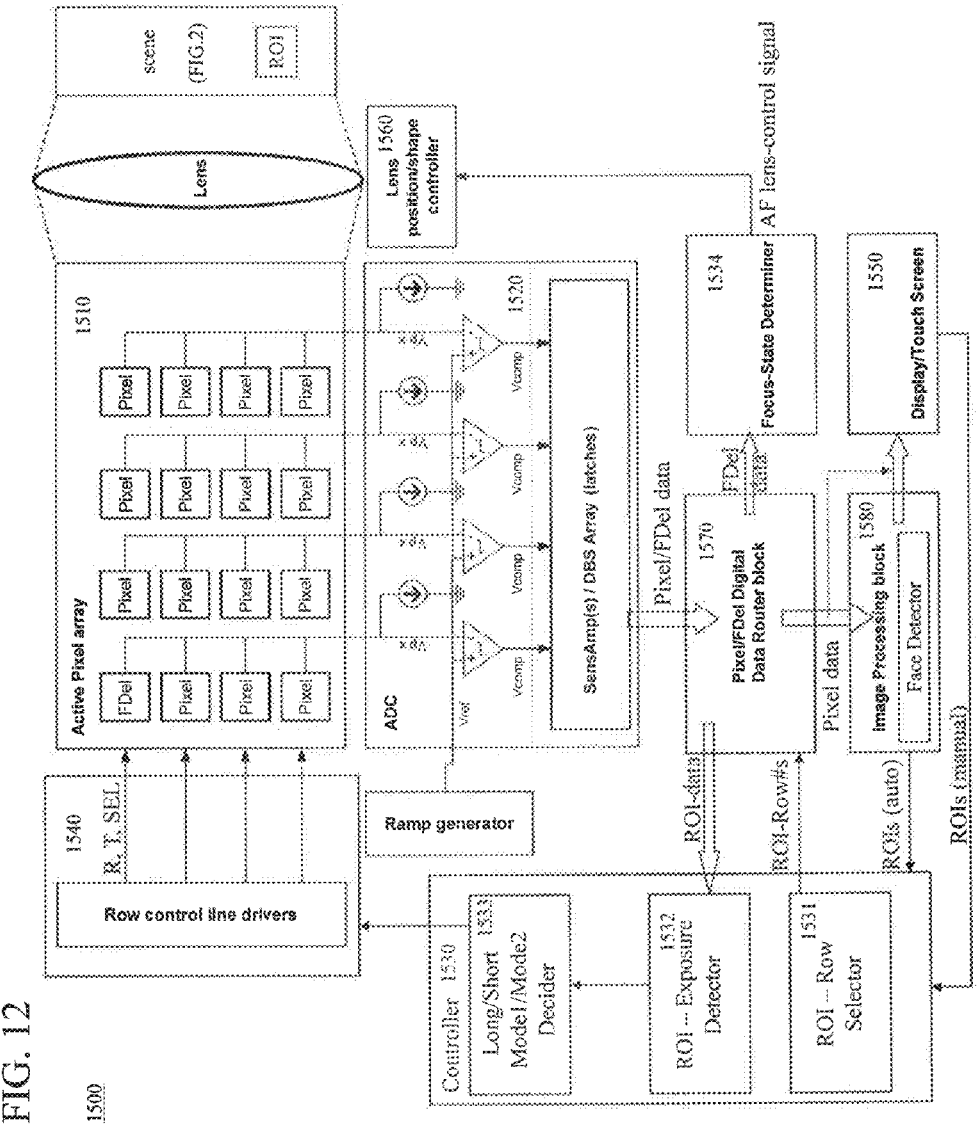
FIG. 12 is a block diagram of an exemplary image-capturing apparatus (e.g., digital camera) adapted to perform the adaptive auto-focus method of FIG. 4A.

FIG. 12 is a block diagram of an exemplary image-capturing apparatus 1500 (e.g., digital camera) adapted to perform the adaptive auto-focus method of FIG. 4A. The apparatus 1500 comprises a light sensor array 1510 (including color pixels and FDels), a Row control/line driving circuit 1540, a Lens, a Lens Focus (position/shape) controller 1560, an analog-to-digital converter ADC 1520, and controller 1530, a Pixel/FDel Data Router Block 1570, an Image Processor 1580, and a Display 1550.

The Lens focuses light from the scene (e.g., the scene of FIG. 2) which includes a region of interest ROI. The region of interest ROI may be selected automatically (ROIs (auto)) as aforesaid, or manually (ROIs manual) by user-input received through a touch-screen display 1500, external buttons (not shown) or voice command input (not shown), as aforesaid. ROIs can be selected automatically, based on image data previously captured in the light sensor array 1510 and received as digital data from the analog-to-digital converter ADC 1520, by operations (e.g., face-detection) performed by the image processing block 1580 or by the Controller 1530. The Controller receives the ROI (auto or manual) selection, and outputs a list of Row numbers of the selected ROI to the Data Router block 1570. The Controller later receives the image data of the selected ROI (ROI-data), and based on that image data (or based on previously received image data corresponding to the selected ROI) outputs a FDel mode-control signal to the Row control/line driver circuit 1540. Then, optimized focus state information based on the FDel mode-control signal is received from the image sensor, and that focus state information is used, by the Focus State Determiner (e.g. a part of the Controller 1530) to calculate the degree of defocus of the selected region of interest ROI. Thus, an auto-focus (AF) lens-control signal is used to activate the Lens position/shape controller to change the focus of the Lens to optimize the focus of image data within the selected region of interest ROI. This may be implemented as a continuous/parallel process such that the focus of the Lens is continuously controlled to optimize the focus of image data within the selected region of interest ROI.

The image processing block 1580 can be implemented as a conventional digital signal processing unit that performs predetermined image processing, such as offset processing, gain control processing including white balance correction and sensitivity correction, gamma correction processing, and RGB/YC conversion processing, to the image signals received through the router 1570. The RGB/YC conversion-processed image data (YC data) is read out from the image processing block 1580 and may be stored and/or outputted to the compression/decompression processing unit (not shown) and a predetermined compression process such as JPEG (joint photographic experts group) is executed. The compressed YC data can be outputted and stored in a memory card (not shown).

The Pixel/FDel Data Router Block 1570 separates and routes the different data types and portions needed by different functional blocks, as desirable to reduce unnecessary data bandwidth, computational loads, and redundancies.

The Controller 1530 comprises a ROI-Row Selector module 1531, a ROI-Exposure mode Detector 1532, a Long/Short Mode Decider 1533, and a Focus-State Determiner 1534. The ROI-Row Selector module 1531 outputs ROI-row numbers based on the (auto or manual) selection of ROI. The ROI-Exposure mode Detector 1532 receives ROI sensor data (e.g., to detect the degree of brightness) and outputs a value to the Long-Short Mode1/Mode2 Decider 1533. The Long-Short Mode1/Mode2 Decider 1533 outputs a mode-selection (a FDel Mode1/Mode2) control signal to the Row control/line driver circuit 1540. The Focus-State Determiner 1534, preferably receives data derived only from the FDels in the array 1510, and shall receive optimized (e.g., unsaturated) FDel data corresponding to the selected region of interest ROI. The Focus-State Determiner 1534 is a defocus amount calculation device configured to receive FDel data from array and to calculate the amount of defocus of the imaging lens based on FDel data from the FDels (e.g., only from FDels of the region of interest). By default (e.g., at the time of the first frame) at power-on, the Focus-State Determiner 1534 can be set to calculate the amount of defocus of the imaging lens based on FDel data from the FDels at a predetermined field of view, (e.g., at the center of the frame). Subsequently, the amount of defocus can be determined based on FDel data from the FDels at a region of interested selected based on face-detection, etc. The Focus-State Determiner 1534 detects the defocus within a predetermined focus area (region of interest) among the image data and outputs control signals to control the position/shape of the lens through the lens focus position/shape controller 1560 to make the amount of defocus "0".

The image-capturing apparatus 1500, can be implemented as part of a digital camera, cellphone, laptop computer, autonomous vehicle, autonomous aircraft, smart-munition, robot, etcetera or any device that captures image data. The apparatus 1500 may further include a shutter button, a mode dial, a replay button, a MENU/OK key, arrow keys, a BACK key, rear-facing camera, microphone, etcetera, for user-input and control.

Referring to FIGS. 4A, 4B and 12, the Controller 1530 performs steps S424, DS430, S452, and S442. The Controller 1530 (1534) and the Lens focus (position/shape) controller 1560 performs step S456 and step S446. The Array 1510, the Row driver 1540 and the ADC 1520 cooperate to perform steps S454 and S444. The Controller 1530, the Image Processing block 1580 and the User can cooperate to perform step S420. Within the Controller 1530, the Long/Short (FDel Mode1/Mode2) Decider performs SubSteps SS432 and DS436, and the ROI-Exposure Detector 1532 performs SubStep SS434.

Figure 13:
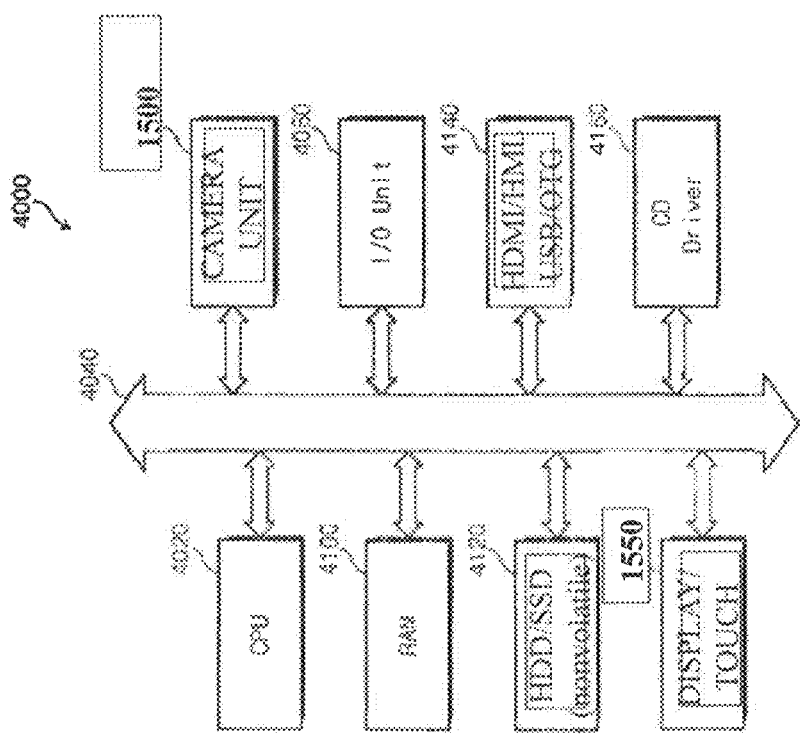
FIG. 13 is a block diagram of a processor-based system 4000 including the digital camera of FIG. 12.

FIG. 13 is a block diagram of a processor-based system 4000 including the camera unit (e.g., camera module) 1500 of FIG. 12. The processor-based system 4000 may be, any digital circuit or apparatus that employs the camera unit 1500. The processor-based system is not limited hereto, but may be a computer system, a camera system, a cell-phone, a scanner, a videophone, a surveillance system, a machine vision system, a vehicle navigation system, a smart-munitions navigation system, planetary rover, terrestrial telescope, satellite telescope, a network-connected system of functional units at different locations (e.g., a remote camera unit 1500), a web/internet-connected system of functional units at different locations (e.g., a remote camera unit 1500), an automatic focus system, a star tracking system, a motion detection system, an image stabilization system, a data compression system, or other system compatible with an camera unit 1500.

The system 4000 includes a processor (e.g., central processor unit, CPU) 4020 communicating with plural devices or peripherals (e.g., the camera unit 1500) via a dedicated bus and/or a wired network 4040. The devices (peripherals) coupled to bus/network 4040, are e.g., an input/output unit 4060 and the camera unit 1500, provide the system 4000 with input/output communication. The devices coupled to bus/network 4040, include at least one peripheral memories, such as a RAM 4100, a non-volatile memory device (e.g., a hard disc drive or solid state drive, HDD and/or SSD) 4120, a HDMI/HML/USB/OTG interface 4140, and a optical disc (e.g., compact disc CD or DVD, or BlueRay disc) drive 4160. The camera unit 1500 receives control signals as data from the processor 4020 or from another device of the system 4000. The processor 402 can send to the camera unit 1500 control signals or data, to control the direction, location, target-definitions (e.g., facial metrics used for ROI selection), internal operations, artificial illumination (flash), frame rate, image-data resolution, etcetera of the camera unit 1500. The controller processor (e.g., central processor unit, CPU) 4020 is configured to exchange data with the RAM 4100, the nonvolatile memory device (e.g., a hard disc drive or solid state drive, HDD and/or SSD) 4120, a HDMI/HML/USB/OTG interface 4140, and a optical disc (e.g., compact disc CD or DVD, or BlueRay disc) drive 4160, and the camera unit 1500, etc. The RAM is used as at least one of an system memory of a processing unit, a cache memory between the nonvolatile memory device 1100 and a buffer memory between the non-volatile memory device 4120.

The camera unit 1500 provides the processor 4020 with an image data signal defining an image captured from a scene (e.g., on basis of control signals or data received by the camera unit 1500), and the processor 4020 can processes the image signals and/or metadata supplied from the camera unit 1500. The metadata of the image data signals may include focus state information (e.g., FDel data or AF lens-control signal data) pertaining to one or more regions of interest (ROI), ROI-data defining ROIs within a scene, scene-recognition data (e.g., face recognition/location data) distance/proximity data for objects in the scene, camera position/jitter information, camera location (e.g., GPS longitude, latitude, elevation) data, camera direction (e.g., compass, angle-of-attack) data, scene location data, etc.

The input/output unit 4060 may include motor controller interfaces or motor controllers for controlling positional changes of the system 4000 (e.g., vehicle movement), and/or positional or directional changes of the camera unit 1500. The input/output unit 4060 may include sensor-interfaces sensors, such as microphones to receive user commands, and/or speakers to output audio signals or warnings, or to support two-way communications (e.g., operation as a cellphone or other communication device).

The input/output unit 4060 and/or the HDMI/HML/USB/OTG interface 4140 may include protocols for performing data exchange between the processor 4020 and a user and/or a house (not shown). For Example, the processor 4020 may be configured to communicate with the outside (host) through at least one of various interface protocols such as a universal serial bus (USB/OTG) protocol, a multimedia card (MMC) protocol, a peripheral component interconnection (PCI) protocol, a PCI-express protocol, an advanced technology attachment (ATA) protocol, a serial-ATA protocol, a parallel-ATA protocol, a small computer small interface (SCSI) protocol, an enhanced small disk interface (ESDI) protocol and an integrated drive electronics (IDE) protocol.

The controller 1200 and the nonvolatile memory device 100 can be integrated into one semiconductor substrate. The input/output unit 4060 and/or the HDMI/HML/USB/OTG interface 4140 can include protocols and hardware to interface with a removable memory card, such as a personal computer memory card international association (PCMCIA) card, a compact flash card (CF), a smart media card (SMC), a memory stick, a multimedia card (MMC, RS-MMC, MMC-micro), a SD card (SD, miniSD, microSD, SDHC), a universal flash memory device (UFS), etc.

The system 4000 may be provided as constituent elements of consumer electronic devices such as an ultra mobile PC (UMPC), a workstation, a net book, a PDA (personal digital assistant), a portable computer, a web tablet, a wireless phone (e.g., with the addition of a modem such as a RF baseband chipset and an RF antenna), a mobile phone, a smart phone, an e-book, a portable multimedia player (PMP), a portable game machine, a navigation device, a black box, a digital camera, a digital multimedia broadcasting (DMB) player, a digital audio player, a digital audio player, a digital picture recorder, a digital picture player, a digital video recorder, a digital video player, a device that can transmit and/or receive data in a wireless communication environment, one of various electronic devices constituting a home network computer, a home-automation system.

The system 4000 or portions of it can be formed of one or more integrated circuits and mounted in various types of package, such as PoP (package on package), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi chip package (MCP), wafer-level fabricated package (WFP), wafer-level processed stack package (WSP) and mounted.

If the system 4000 is a mobile device, it may further include a battery (not shown) for supplying the operating (power supply) voltage of the system 4000. Although not illustrated in FIG. 13, those skilled in the art will readily understand that the system 4000 may further include an application chipset, a camera image processor (CIS).

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A method of adaptive auto-focusing of an image capture device, having a lens and an array of light sensors including plurality of pixels and a plurality of focus state detecting elements (FDels) to obtain lens focus state information, the method comprising:
    selecting one of a first and second modes of the image capture device based on a measurement of a currently-detected property of a selected region of interest within a scene to be captured by the array of light sensors, wherein in the first mode the FDels in the array of light sensors are exposed for a loner exposure time than the plurality of pixels, wherein in the second mode the FDels in the array of light sensors are exposed for a shorter exposure time than the plurality of pixels; and
    obtaining lens focus state information corresponding to the selected region of interest by capturing light from the selected region of interest in a first and second FDels among the plurality of FDels, operated with the selected mode.

2. The method of claim 1, wherein setting the exposure time of first and second FDels, includes:
    changing the mode from a default first mode to the second mode if the measurement of the currently-detected property is greater than a predetermined threshold value; and
    leaving the selected mode at the default first mode if the currently-detected property is less than the predetermined threshold value.

3. The method of claim 1, further comprising:
    performing an AutoFocus algorithm for focusing the lens of the image capture device upon the selected region of interest based upon obtained lens focus state information corresponding to the selected region of interest.

4. The method of claim 2, further comprising focusing the lens of the image capture device upon the selected region of interest based upon obtained lens focus state information corresponding to a defocus of the selected region of interest.

5. The method of claim 1, wherein the currently-detected property of a selected region of interest within the scene is an average brightness of the selected region of interest.

6. The method of claim 5, wherein the currently-detected property of the selected region of interest within the scene is a brightness of the selected region of interest as detected by at least one of the first and second FDels.

7. The method of claim 5, wherein the currently-detected property of the selected region of interest within the scene is a brightness of the selected region of interest as detected by at least one of a R, G or B color-filtered light sensor among the array of light sensors.

8. An imaging apparatus comprising:
    an image sensor including a light sensor array including a first plurality of picture elements (pixels) and a plurality of focus state detecting elements (FDels), wherein each of the pixels and each of the FDels includes a photodiode;
    a lens configured to focus light from a scene onto the light sensor array for capturing a frame;
    a lens-focus controller configured to control a focus state of the lens relative to the light sensor array and relative to a first region of the scene based on a lens-control signal;
    a scene-condition calculator for calculating a selected condition of a first selected portion of the frame captured from the first region of the scene; and
    a mode selector for selecting one of a first and second modes of the image sensor based on a scene-condition calculation,
    wherein in the first mode the FDels in the light sensor array are exposed for a longer exposure time than the first plurality of pixels, and
    wherein in the second mode the FDels in the light sensor array are exposed for a shorter exposure time than the first plurality of pixels.

9. The apparatus of claim 8, further including a second plurality of picture elements (pixels).

10. The apparatus of claim 9, wherein during the first mode the FDels and the second plurality of pixels are exposed for a longer exposure time than the first plurality of pixels.

11. The apparatus of claim 9, wherein each of the first plurality of pixels and the second plurality of pixels include color-filtered pixels.

12. A computing system comprising:
    a central processing unit (CPU) configured to control an imaging apparatus, wherein the imaging apparatus includes:
    an image sensor including a light sensor array including a first plurality of picture elements (pixels) and a plurality of Focus state Detecting elements (FDels), wherein each of the pixels and each of the FDels includes a photodiode;
    a lens configured to focus light from a scene onto the light sensor array for capturing a frame; and
    a lens-focus controller configured to control a focus state of the lens relative to the light sensor array and relative to a first region of the scene based on a lens-control signal;
    a scene-condition calculator for calculating a selected condition of a first selected portion of the frame captured from the first region of the scene;
    a mode selector for selecting one of a first and second modes of the image sensor based on a scene-condition calculation, wherein in the first mode the FDels in the light sensor array are exposed for a longer exposure time than the first plurality of pixels, and wherein in the second mode the FDels in the light sensor array are exposed for a shorter exposure time than the first plurality of pixels.

13. The computing system of claim 12, wherein the CPU is configured to receive image data from the imaging apparatus.

14. The apparatus of claim 13, wherein a selected scene-condition is brightness, wherein the scene-condition calculator includes an exposure calculator for calculating the brightness of the first selected portion of the frame; and wherein the mode selector selects one of the first and second modes of the image sensor based on a calculated brightness, wherein if the calculated brightness is greater than a predetermined brightness threshold, the mode selector selects the second mode.

15. The apparatus of claim 12, further including a second plurality of picture elements (pixels).

16. The apparatus of claim 15, wherein in the first mode the FDels and the second plurality of pixels are exposed for a longer exposure time than the first plurality of pixels.

17. The apparatus of claim 15, wherein each of the first plurality of pixels and the second plurality of pixels includes color-filtered pixels.

18. The apparatus of claim 17, wherein the first plurality of pixels and the second plurality of pixels and the FDels within one pair of vertically adjacent rows of the light sensor array are controlled with a 2-shared pixel wiring patter.

19. The apparatus of claim 12, wherein the FDels are read out resulting in a focus state image.

20. The apparatus of claim 12, wherein in the first mode after the first plurality of pixels have been exposed to light from the scene for a first exposure time and read out, then the FDels are read out resulting in a focus state image of a second exposure time longer than the first exposure time.

\* \* \* \* \*